(12) United States Patent
Dötsch et al.

(10) Patent No.: US 7,072,422 B2
(45) Date of Patent: Jul. 4, 2006

(54) DEVICE AND METHOD FOR SPECTRALLY SHAPING A TRANSMISSION SIGNAL IN A RADIO TRANSMITTER

(75) Inventors: Markus Dötsch, Schliern (CH); Peter Jung, Otterberg (DE); Jörg Plechinger, München (DE); Peter Schmidt, Ellerstadt (DE); Michael Schneider, München (DE); Tideya Kella, München (DE)

(73) Assignee: Infineon Technologies AG, Munich (DE)

( * ) Notice: Subject to any disclaimer, the term of this patent is extended or adjusted under 35 U.S.C. 154(b) by 733 days.

(21) Appl. No.: 10/112,292

(22) Filed: Mar. 28, 2002

(65) Prior Publication Data

US 2002/0131520 A1 Sep. 19, 2002

Related U.S. Application Data

(63) Continuation of application No. PCT/DE00/03346, filed on Sep. 22, 2000.

(30) Foreign Application Priority Data

Sep. 29, 1999 (DE) .............................. 199 46 722

(51) Int. Cl.
*H03C 3/00* (2006.01)
(52) U.S. Cl. ..................... 375/302; 375/298; 375/308
(58) Field of Classification Search ................ 375/295, 375/298, 302, 308; 708/316
See application file for complete search history.

(56) References Cited

U.S. PATENT DOCUMENTS 5,783,974 A * 7/1998 Koslov et al. ............... 332/103
5,818,867 A 10/1998 Rasmussen et al.

FOREIGN PATENT DOCUMENTS

| DE | 32 02 005 A1 | 11/1982 |
|----|---|---|
| DE | 36 09 394 C2 | 9/1986 |
| DE | 43 13 772 C1 | 6/1994 |
| EP | 0 458 385 A2 | 11/1991 |
| EP | 0 622 898 A2 | 11/1994 |
| EP | 0 693 844 A2 | 1/1996 |
| EP | 0 944 215 A2 | 9/1999 |

* cited by examiner

*Primary Examiner*—Jay K. Patel
*Assistant Examiner*—David B. Lugo
(74) *Attorney, Agent, or Firm*—Laurence A. Greenberg; Werner H. Stemer; Ralph E. Locher

(57) ABSTRACT

A device for spectrally shaping a discrete-value transmission signal, in a radio transmitter, includes one input for receiving an in phase component of the transmission signal and a further input for receiving a quadrature component of the transmission signal. The device also includes a filter circuit with a plurality of multipliers. A multiplexing unit is located in the signal path before the filter circuit, and a demultiplexing unit is located in the signal path after the filter circuit.

13 Claims, 6 Drawing Sheets

DEVICE AND METHOD FOR SPECTRALLY SHAPING A TRANSMISSION SIGNAL IN A RADIO TRANSMITTER

CROSS-REFERENCE TO RELATED APPLICATION

This application is a continuation of copending International Application No. PCT/DE00/03346, filed Sep. 22, 2000, which designated the United States.

BACKGROUND OF THE INVENTION

Field of the Invention

The invention relates to a device and a method for spectrally shaping a transmission signal in a radio transmitter, in particular a mobile radio transmitter.

A known digital quadrature modulator, shown for example, in Published European Patent Application, EP 0 693 844 has a digital filter for spectrally shaping an in phase component and a quadrature component of a digital input signal. In this case, a multiplexer with two inputs (for the I branch and the Q branch) is connected upstream of each multiplier of the digital filter, and a demultiplexer with one input and two outputs is connected downstream of each multiplier. As a result, the same (multiplexed) multipliers are used for filtering the I branch and the Q branch.

In a known nonrecursive half-band filter device, shown for example, in Published European Patent Application, EP 0 622 898 A2, a single filter arrangement is provided for processing a complex input signal into a complex output signal with a reduction of the sampling rate. Temporally offset real and imaginary parts of the input signal are fed into this filter arrangement. The filter device, for this purpose, has time-delay elements that are coupled for sequentially picking up and buffering the alternating real and imaginary parts.

It is already known to subject a discrete-value (digital) transmission signal to signal shaping before converting the signal into an analog baseband signal and upwardly mixing the analog baseband signal to form a radio-frequency traffic channel, in order to permit narrow-band transmission of information that thereby sparingly uses frequency resources. The signal shaping is usually accomplished by at least two digital filters that are arranged in the in-phase branch (I branch) or in the quadrature branch (Q branch) of the signal path in the radio transmitter. Each digital filter has a large number of multipliers (see, for example, FIG. 3).

The filters can comprise up to approximately 70% of the chip area in a typical DSP (Digital Signal Processor) transmitter chip for a mobile radio transmitter. It is therefore disadvantageous that the multiple use of identical components (filters, multipliers) necessitates a substantial outlay of hardware for implementing the spectral signal shaping.

SUMMARY OF THE INVENTION

It is accordingly an object of the invention to provide an apparatus for spectrally shaping a discrete-value transmission signal in a radio transmitter and a method for spectrally shaping a discrete-value transmission signal in a radio transmitter which overcome the above-mentioned disadvantages of the prior art apparatus and methods of this general type.

In particular, it is an object of the invention to provide an apparatus for spectrally shaping a discrete-value transmission signal in a radio transmitter that can be implemented with a comparatively low outlay. It is also an object of the invention to provide a method for spectrally shaping a discrete-value transmission signal in a radio transmitter that can be performed with a reduced hardware complexity as compared to the prior art.

With the foregoing and other objects in view there is provided, in accordance with the invention, a device for spectrally shaping a discrete-value transmission signal in a radio transmitter. The device includes: a first input for receiving an in-phase component of the transmission signal; a second input for receiving a quadrature component of the transmission signal; a first shift register having N first memory locations, the first shift register connected to the first input; a second shift register having N second memory locations, the second shift register connected to the second input; a multiplexer unit having a plurality of multiplexers; a discrete-value filter circuit having a plurality of multipliers and at least one adder; a first output for providing a filtered in-phase component of the transmission signal; a second output for providing a filtered quadrature component of the transmission signal; a demultiplexer unit; and a signal path. Each of the memory locations of the first shift register has M signal taps. Each of the memory locations of the second shift register has M signal taps, where M is greater than one. The multiplexer unit is configured in the signal path downstream from the first shift register and the second shift register. The multiplexer unit is configured in the signal path upstream of the filter circuit. The demultiplexer unit is configured in the signal path downstream of the filter circuit and upstream of the first output and the second output.

In accordance with an added feature of the invention, a plurality of filter coefficients are assigned to a single one of the plurality of the multipliers.

In accordance with an additional feature of the invention, the number of multiplexers in the multiplexer unit is N×M; and each one of the plurality of the multiplexers includes two multiplexer inputs.

In accordance with another feature of the invention, the nukmber of multiplexers in the multiplexer unit is N; and each one of the multiplexers includes 2×M multiplexer inputs.

In accordance with a further added feature of the invention, the multipliers have filter coefficients that have been selected such that the filter circuit performs Root-Raised-Cosine filtering.

In accordance with a further additional feature of the invention, the filtered in-phase component of the transmission signal has a sampling rate that is higher than that of the in-phase component of the transmission signal received at the first input by a multiple; and the filtered quadrature component of the transmission signal has a sampling rate that is higher than that of the quadrature component of the transmission signal received at the second input by the multiple. The multiple is preferably 4.

With the foregoing and other objects in view there is provided, in accordance with the invention, a method for spectrally shaping a discrete-value transmission signal in a radio transmitter, which includes steps of: providing an in-phase component of the transmission signal at a first input that is connected to a first shift register having N first memory locations; providing a quadrature component of the transmission signal at a second input that is connected to a second shift register having N second memory locations; filtering the in-phase component of the transmission signal and the quadrature component of the transmission signal in a discrete-value filter circuit having a plurality of multipliers and at least one adder; in a signal path upstream of the filtering, multiplexing the in-phase component of the transmission signal and the quadrature component of the transmission signal; at each one of the N first memory locations, providing an output signal at a plurality of taps; at each one of the N second memory locations, providing an output signal at a plurality of taps; and demultiplexing the in-phase component of the transmission signal and the quadrature component of the transmission signal in a signal path downstream of the filtering.

In accordance with an added mode of the invention, a plurality of filter coefficients are assigned to a single one of the plurality of the multipliers.

In accordance with an additional mode of the invention, Root-Raised-Cosine filtering is performed with the filter circuit.

The basic principle of the invention consists in providing each of the respective N memory locations of the two shift registers with M>1 signal taps, and operating the filter circuit in multiplex mode so that both the I component and the Q component of the transmission signal can be spectrally shaped using one and the same filter circuit. It is thereby possible to substantially reduce the number of multipliers that are actually implemented on a transmitter chip, and thus also the need for chip area.

A further advantage of the invention is that after the filtering—as conditioned by the multiple memory taps—the two output signals (I component, Q component of the transmission signal) are present with a higher rate than that of the corresponding signals at the inputs of the signal-shaping device. This is advantageous because subsequent signal processing would require the undertaking of over-sampling to suppress interference, but this is performed "automatically" in the case of the invention.

A particularly preferred embodiment of the invention is characterized in that a plurality of filter coefficients are assigned to a single multiplier. In this case, not only is multiple use made of the filter circuit (specifically for the I and Q branches), but each multiplier is also utilized multiply (specifically for the various filter coefficients), that is to say is employed even more efficiently in terms of hardware.

A first preferred embodiment is characterized in that the multiplexer unit is constructed from N×M multiplexers with two multiplexer inputs in each case. In this case, the multipliers alternately operate in the I and Q branches of the signal path.

A second preferred embodiment, which implements the already mentioned multiple use of the multipliers with reference to different filter coefficients, is characterized in that the multiplexer unit is constructed from N multiplexers with 2×M multiplexer inputs in each case. Here, a multiplier operates for M multiplexer working clock pulses in the I branch and for the next M multiplexer working clock pulses in the Q branch, etc.

Other features which are considered as characteristic for the invention are set forth in the appended claims.

Although the invention is illustrated and described herein as embodied in a device and method for spectrally shaping a transmission signal in a radio transmitter, it is nevertheless not intended to be limited to the details shown, since various modifications and structural changes may be made herein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
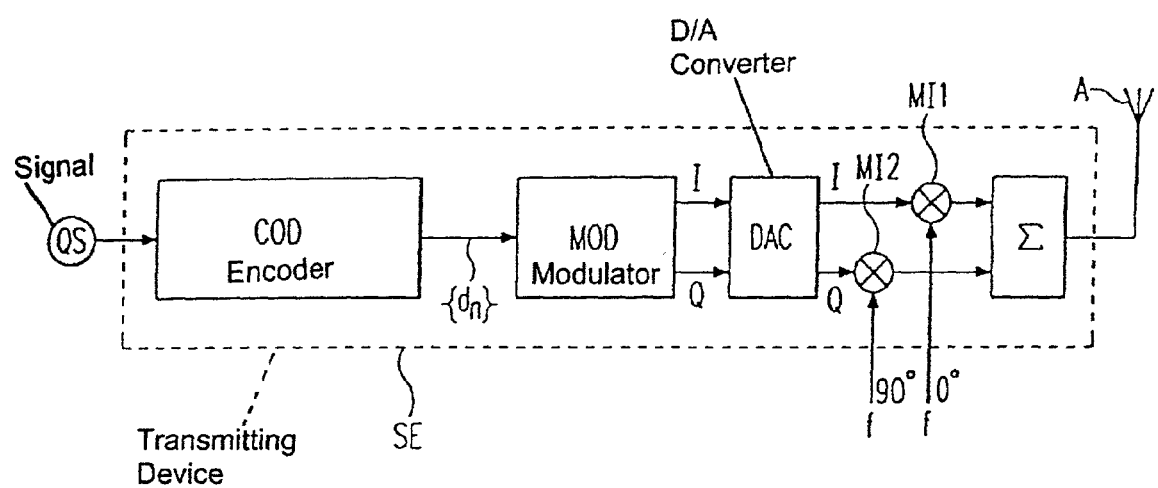
FIG. 1 is a block diagram of a radio transmitter for generally explaining signal processing taking place in the transmitter.

Referring now to the figures of the drawing in detail and first, particularly, to FIG. 1 thereof, there is shown, the structure of a transmitting device SE of a radio transmitter, as it is used, for example, in a base station or a mobile station of a mobile radio system.

The transmitting device SE receives an analog source signal QS (generated, for example, by a microphone), and feeds it to an encoder COD. The encoder COD includes, in a way not illustrated, an analog-to-digital converter for digitizing the source signal and can, furthermore, include a source encoder, a channel encoder, an interleaver and a block former, which in a suitable way subject the digitized source signal QS to source coding, error protection coding and interleaving, and subdivide it into data blocks.

The encoder COD outputs a discrete-value data signal which consists of a data sequence $\{d_n\}$ of the elements $d_0$, $d_1$, . . .

The data sequence $\{d_n\}$ is fed to a modulator device MOD that modulates the data sequence for emission using a radio-frequency carrier, and—in the case of a CDMA (Code Division Multiple Access) system—impresses an individual subscriber spread code on each data symbol. A CPM (Continuous Phase Modulation) method with a continuous phase and a constant complex envelope can, for example, be utilized for modulation, and one of the known spread code methods, for example, DS (Direct Sequencing) CDMA, MC (Multi Carrier) CDMA, or else FH (Frequency Hopping) CDMA can be used for CDMA subscriber coding.

The modulator device MOD further splits the data signal into the I branch and the Q branch. The I and Q signal components output by the modulator device MOD are fed to a digital-to-analog converter DAC which generates the corresponding analog I and Q signal components. These are respectively mixed upward in conjunction with a mutual phase offset of 90° in mixing stages MI1 and MI2, respectively, and using a radio-frequency carrier of frequency f, are superimposed and emitted via an antenna A as a radio signal.

Figure 2:
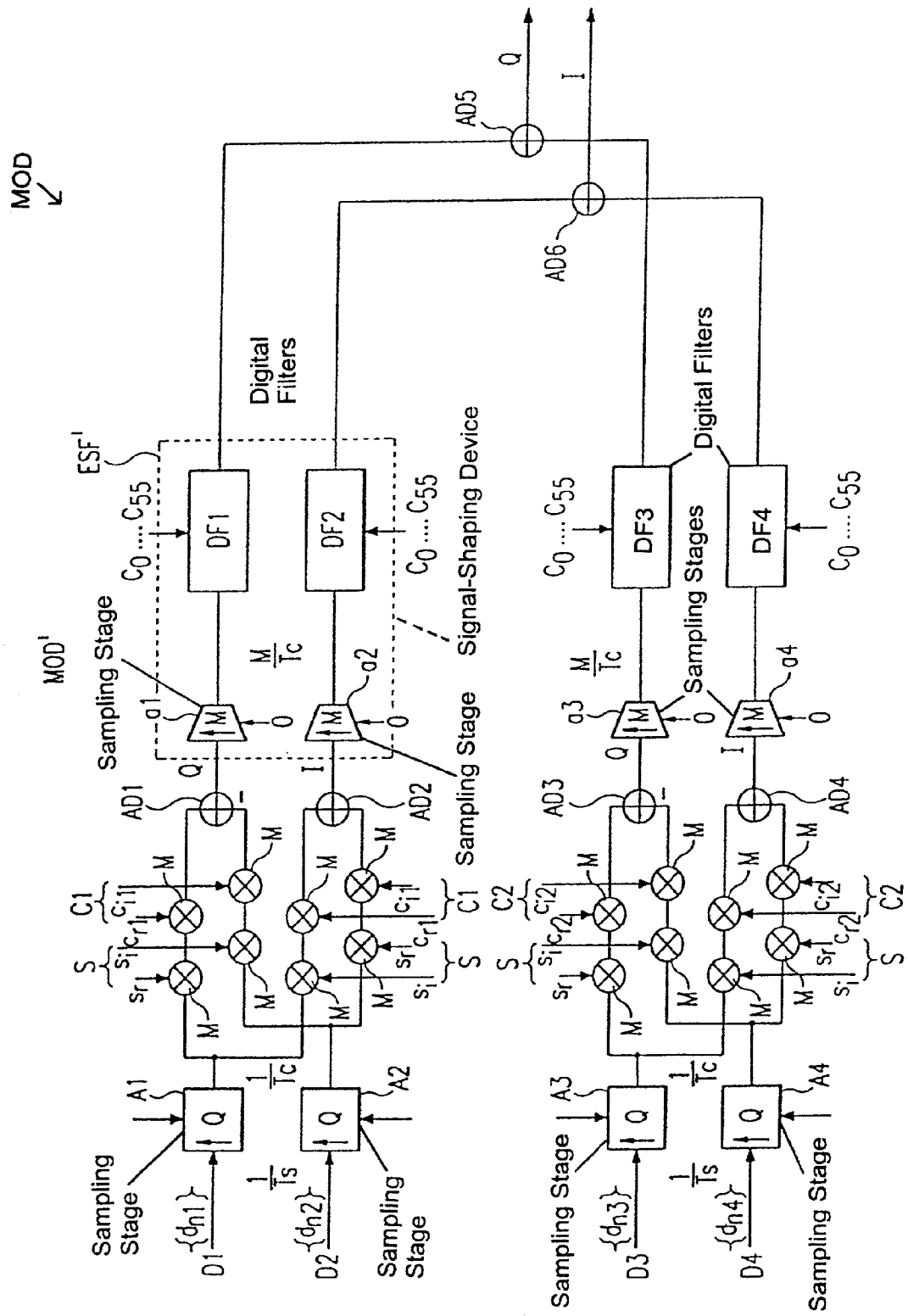
FIG. 2 is a block diagram of a prior art modulator.

FIG. 2 shows a prior art modulator device MOD'. The modulator device MOD' has four data inputs D1, D2, D3 and D4, and is therefore suitable for simultaneously setting-up four physical channels.

The data sequences $\{d_{n1}\}$, $\{d_{n2}\}$, $\{d_{n3}\}$ and $\{d_{n4}\}$ are present at the data inputs D1, D2, D3, and D4.

The data sequences $\{d_{n1}\}$, $\{d_{n2}\}$, $\{d_{n3}\}$ and $\{d_{n4}\}$ are sampled by sampling stages A1, A2, A3, A4 with oversampling (oversampling factor Q). The data rate is increased as a result in each signal path from $1/T_s$ to $1/T_c$, $T_s$ denoting the symbol duration of the individual data symbols $d_{n1}$ (and $d_{n2}$, $d_{n3}$, $d_{n4}$) and $T_c$ denoting the (shorter) chip duration, which constitutes the time basis for the later CDMA coding. In the case of a third mobile radio generation UMTS (Universal Mobile Telecommunications System) transmitter, the data rate $1/T_c$ at the output of the sampling stages A1, A2, A3, A4 (that is to say the chip rate) is $4.096 \times 10^6$ samples per second.

Using multipliers M, the (oversampled) data symbols are subsequently multiplied by a complex scrambling code S and two CDMA codes C1 (for the data symbols $d_{n1}$ and $d_{n2}$) or C2 (for the data symbols $d_{n3}$ and $d_{n4}$). Here, $s_r$, $c_{r1}$ and $c_{r2}$ denote the real parts, and $s_i$, $c_{i1}$ and $c_{i2}$ denote imaginary parts of the elements of the previously mentioned code sequences.

The I components and the Q components of the corresponding digital transmission signals are generated by adding the real and imaginary parts of the signals thus generated in the adders AD1, AD2, AD3 and AD4.

The further signal processing is explained using the Q and I signal components that are assigned to the data inputs D1 and D2 and that are illustrated in the upper half of FIG. 2. The processing of the Q and I signal components assigned to the data inputs D3 and D4 is of a corresponding nature.

The Q and I signal components are input into a device for spectral signal shaping ESF' whose extent is represented in FIG. 2 by a dashed line. The device for spectral signal shaping ESF' includes a respective sampling stage a1 or a2 for each signal component. Each sampling stage a1 or a2, for a respective signal component, increases the signal rate to a multiple M of the chip rate $1/T_c$ by a renewed oversampling.

Connected downstream of the sampling stages a1 and a2 are digital filters DF1, DF2 that spectrally shape the Q signal component and the I signal component, respectively. The structure of the prior art digital filters DF1, DF2 is explained in more detail later with reference to FIG. 3.

The processing of the Q and I signal components assigned to the data inputs D3 and D4 are analogously processed by the sampling stages a3 and a4, and by the digital filters DF3 and DF4.

The spectrally shaped Q signal components are added by an adder AD5, and the spectrally shaped I signal components are added by an adder AD6. The Q and I signal components are subject, as appropriate, to frequency correction (not illustrated), and are then relayed to a digital-to-analog converter DAC such as that shown in FIG. 1.

Figure 3:
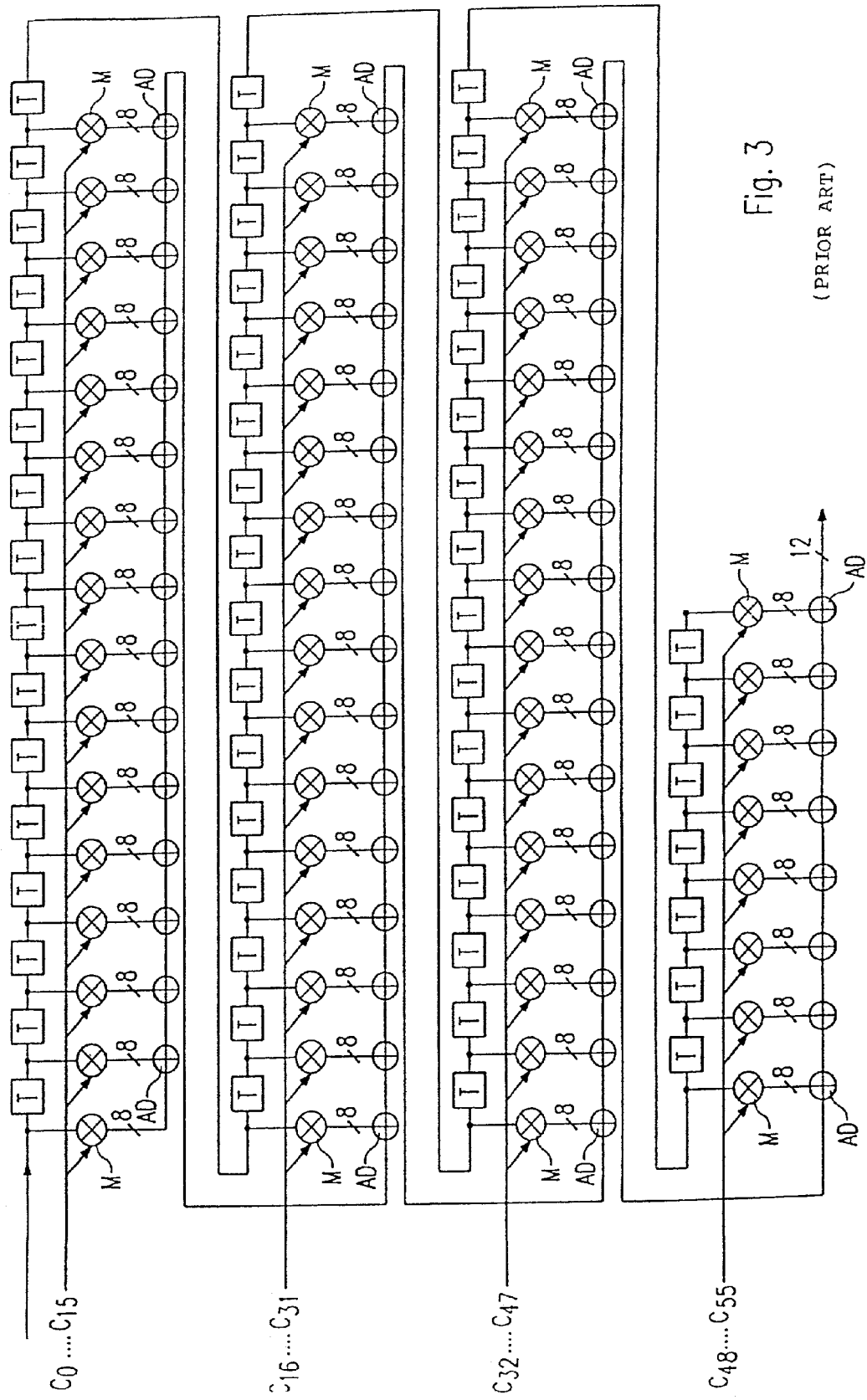
FIG. 3 is a block diagram of a prior art single RRC filter.

FIG. 3 shows the design of a known filter DF1 or DF2 as used in the modulator design MOD' illustrated in FIG. 2. The filter has a shift register with 55 memory locations T, and 56 multipliers M as well as 55 adders AD. One of the inputs of each of the multipliers M are connected in parallel to a common tap. The multipliers M are present between and downstream of the memory locations T. The other input of each of the multipliers M is supplied with a respective one of the filter coefficients $C_0, \ldots, C_{55}$. The adders AD add up the multiplication results that are calculated by the multipliers M.

The coefficients $C_0, \ldots, C_{55}$ of the filter are yielded from the samples of the filter transfer function at a rate of $M/T_c$. In the design illustrated here with 56 filter coefficients $C_0, \ldots, C_{55}$, fourteen chips of the Q and I signal component, respectively, are accommodated in the filter in the case of an M=4-fold oversampling.

Figure 4:
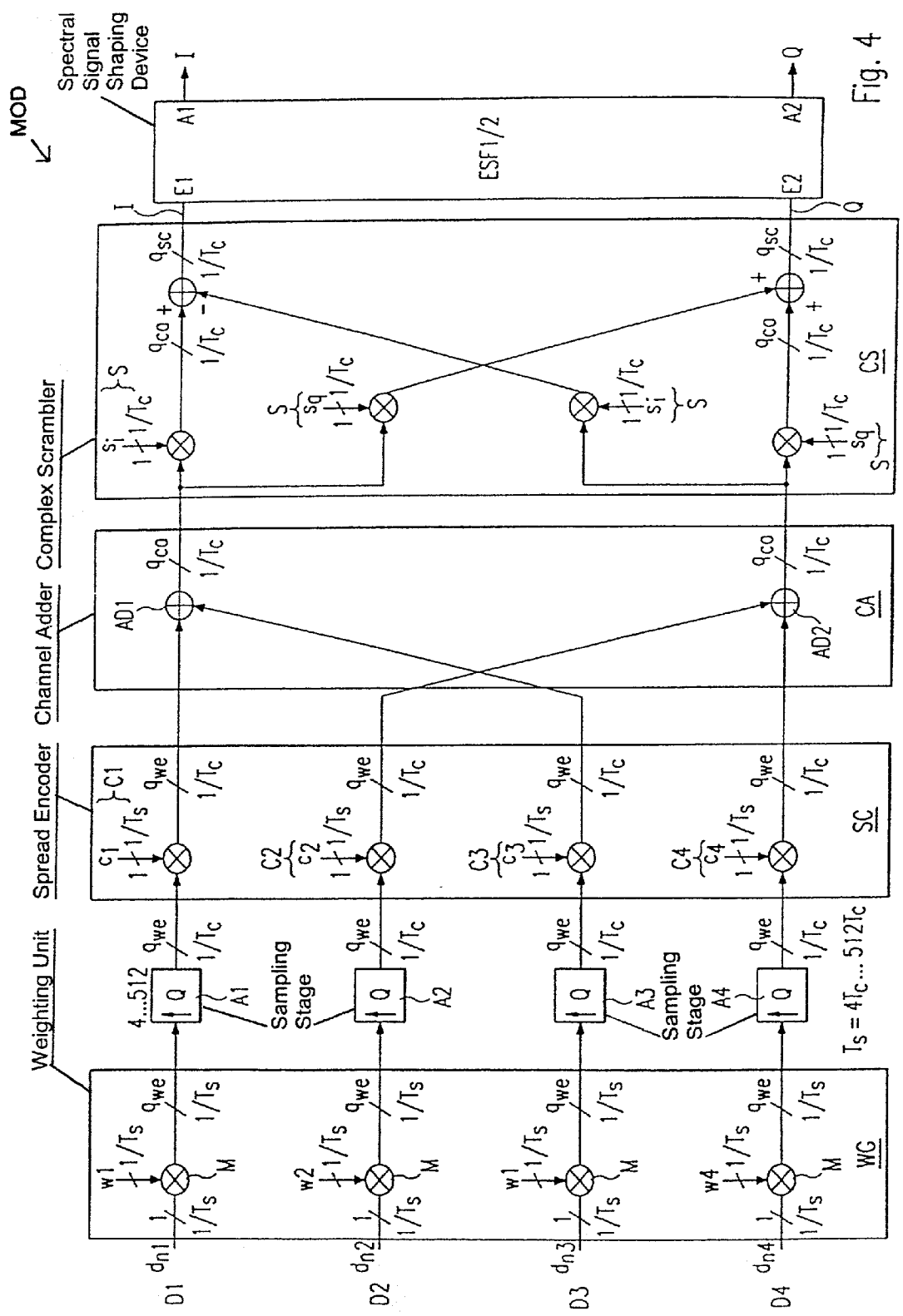
FIG. 4 is a block diagram of a modulator with an inventive spectral signal shaping device.

FIG. 4 shows a block diagram of an embodiment of a modulator device MOD that can be used in the present invention. Patrs that are the same as those shown in the preceding figures are marked with the same reference symbols, or are represented by the same circuit symbols.

The data sequences $\{d_{n1}\}, \{d_{n2}\}, \{d_{n3}\}, \{d_{n4}\}$, are present at the data inputs D1, D2, D3, D4 and have a word length 1 and a data symbol rate $1/T_s$. The individual data symbols $d_{n1}, d_{n2}, d_{n3}, d_{n4}$ can be extracted from the set of values $\{1, -1\}$.

In an optional weighting unit WG, the data symbols are weighted synchronously with the symbol clock by being multiplied by the weighting factors w1, w2, w3 and w4, respectively. The data signals available at the outputs of the weighting unit have a word length of $q_{we} > 1$. Their data rate is unchanged at $1/T_s$.

The weighting factors w1, w2, w3, w4 can be interpreted as "loudness factors". By using different weighting factors w1, w2, w3, w4 in the respective channels, different radio distances can be taken into account with reference to the various channels, and/or when different spread factors Q are used I the respective channels, the different channel energies effected thereby can be compensated.

The sampling stages A1, A2, A3, A4 increase the signal rate by the oversampling factor (=spread factor) Q, and make a high-rate signal available at their output synchronously with the chip timing clock $1/T_C$. The oversampling factor Q can be, for example, between 4 and 512, that is to say $T_S = 4T_c \ldots 512T_c$.

The Q-fold oversampled data symbols $d_{n1}, d_{n2}, d_{n3}, d_{n4}$ are then spread coded in the spread encoder SC by impressing a channel-specific digital spread code sequence. A first spread code sequence C1 consisting of Q digital chips $c_1$ is impressed in each case onto the data symbols $d_{n1}$, fed from the first data input D1. There is a corresponding procedure with reference to the data symbols $d_{n2}, d_{n3}, d_{n4}$ fed from the further data inputs D2, D3, D4. Impressing the spread code sequences C1, C2, C3, C4 provides each data symbol with a "fingerprint" of its channel, as it were. The spread coded data signals are available at the output of the spread encoder SC with a signal rate of $1/T_c$ and an (unchanged) word length of $q_{we}$.

Located in the signal path downstream of the spread encoder SC is a channel adder CA. The channel adder CA includes two adders AD1, AD2 operating synchronously with the chip clock. The adder AD1 adds the signal data originating from the data inputs D1, D3, and the adder AD2 adds the signal data originating from the data inputs D2 and D4. Data signals with a signal rate of $1/T_c$ and a (possibly increased) word length of $q_{ca}$ are present at the two outputs of the channel adder CA.

A complex scrambler CS impresses a base station identifier on the data signals. For this purpose the signals that are output by the channel adder CA are multiplied in the way illustrated by the real and imaginary parts $s_q$ or $s_i$, respectively, of the elements of a complex scrambling code sequence S, and are subsequently added as shown in a crosswise fashion. Furthermore, the complex scrambler CS generates the I and Q signal components of the transmission signal, which are available at the output of the complex scrambler CS with a signal rate of $1/T_c$ and a word length of $q_{sc}$.

These two signal components (I and Q) are fed to the inputs E1, E2 of a device for spectral signal shaping ESF1/2. The device for spectral signal shaping ESF1/2 makes the spectrally shaped (that is to say, modulated) I and Q signal components, respectively, available at its outputs A1, A2. As shown in FIG. 1, these I and Q signal components are converted into analog signals using a frequency correction (not illustrated), and are emitted as a radio signal.

Figure 5:
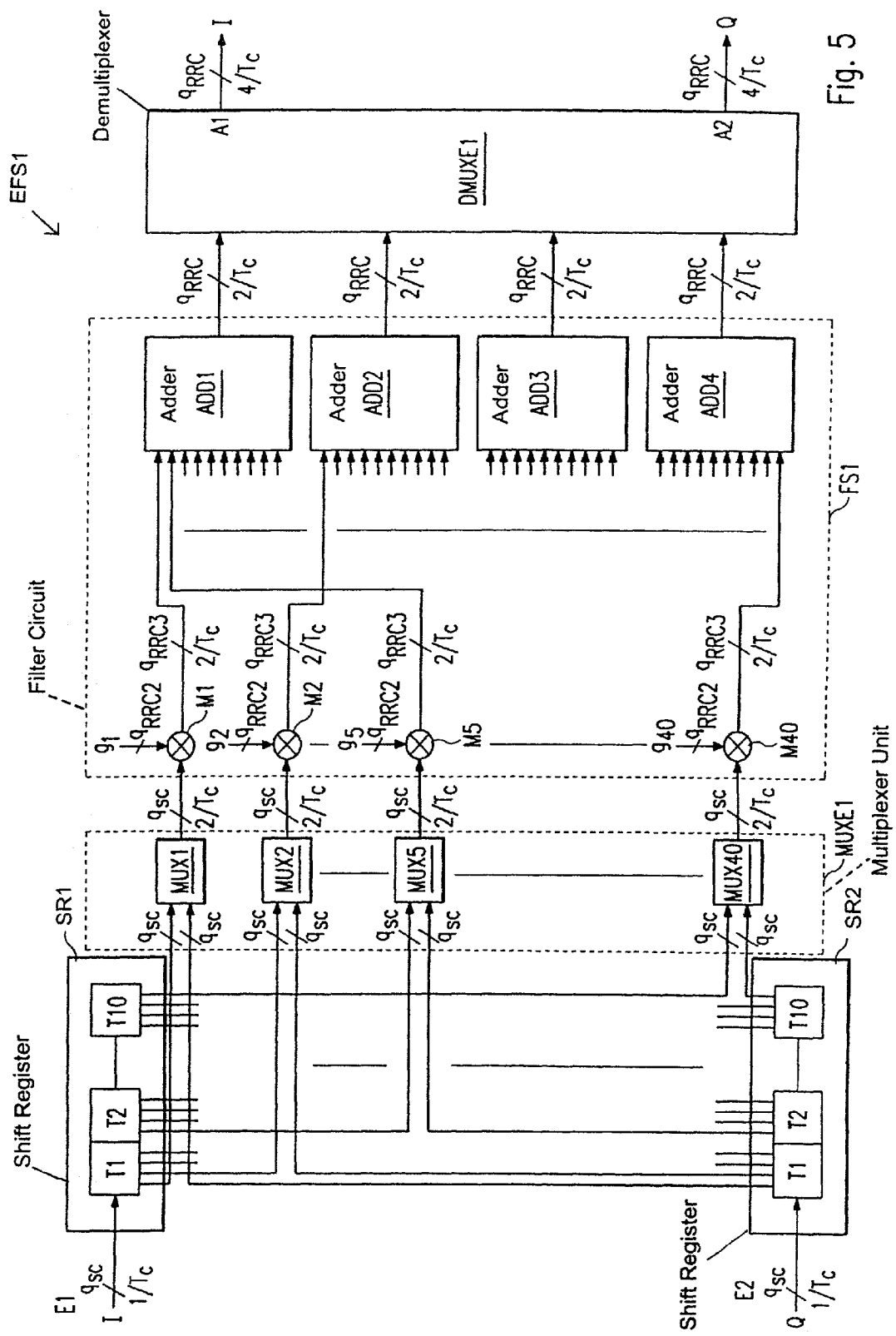
FIG. 5 is a circuit diagram of a first embodiment of the spectral signal shaping device shown in FIG. 4.
Figure 6:
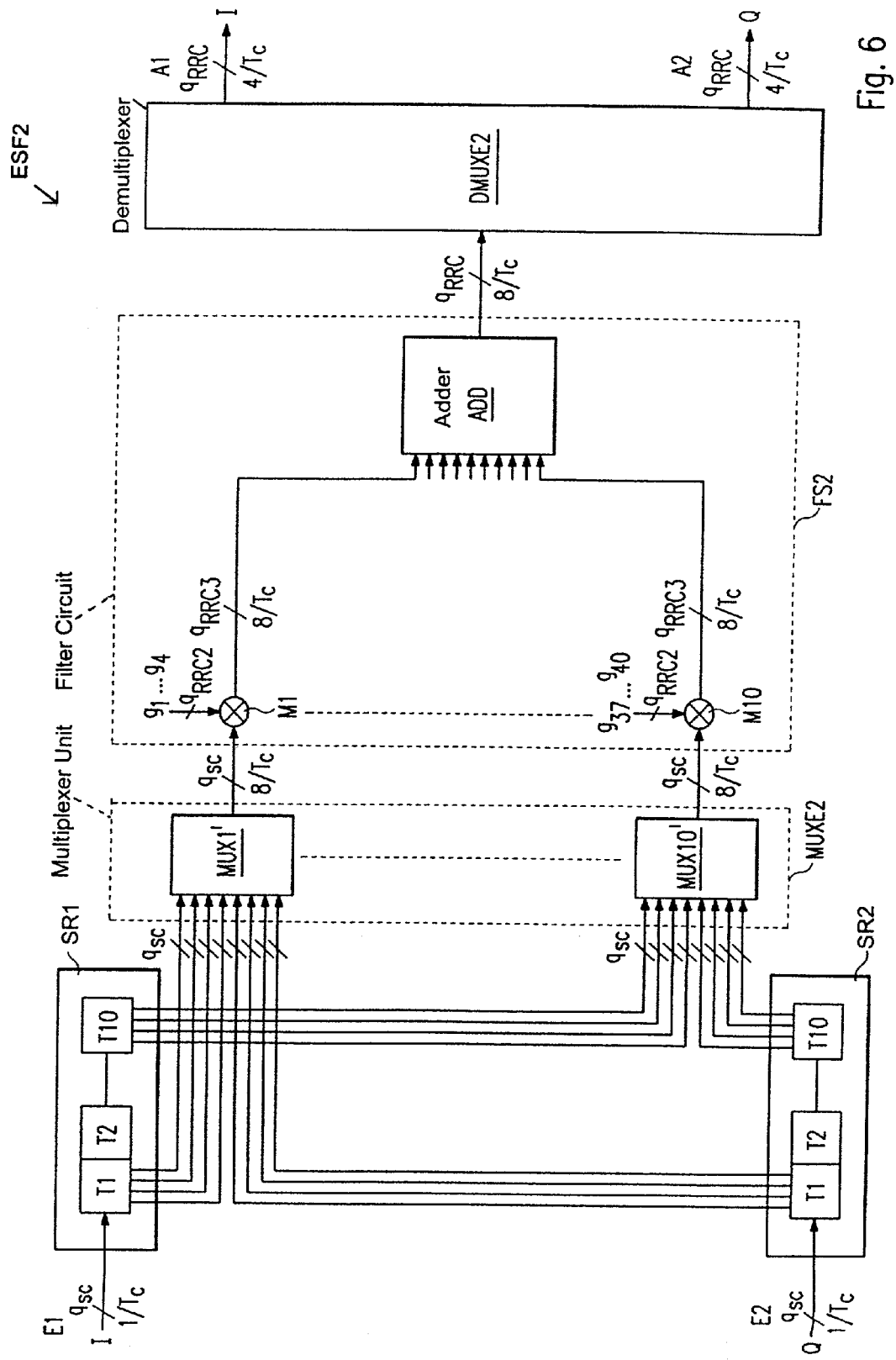
FIG. 6 is a circuit diagram of a second embodiment of the spectral signal shaping device shown in FIG. 4.

FIGS. 5 and 6 each show a circuit diagram of an embodiment (ESF1 or ESF2) of the device for spectral signal shaping.

According to FIG. 5, the I signal component is fed to a first shift register SR1 and the Q signal component is fed to a second shift register SR2 which each have ten memory locations T1, T2, . . . , T10. Each memory location T1, T2, . . . , T10 stores a data word of word length $q_{sc}$. The data words are pushed through the two shift registers SR1 and SR2 synchronously with the chip clock $1/T_c$.

Four taps are respectively located at each memory location T1, T2, . . . , T10 of the two shift registers SR1 and SR2 such that each shift register SR1 and SR2 has a total of 40 taps. The total of 80 taps of the two shift registers SR1 and SR2 are fed to a multiplexer unit MUXE1.

The multiplexer unit MUXE1 includes 40 multiplexers MUX1, MUX2, . . . , MUX40. Each multiplexer MUX1, MUX2, . . . MUX40 has two multiplexer inputs. The first tap of the first memory cell T1 of the shift register SR1 in the I signal path leads to one multiplexer input of the first multiplexer MUX1, and the first tap of the first memory cell T1 of the shift register SR2 in the Q signal path leads to the second multiplexer input of the first multiplexer MUX1. In a similar way, the second taps of the two shift registers SR1 and SR2 in each case lead to the two multiplexer inputs of the second multiplexer MUX2, . . . , and the two fortieth taps of the shift registers SR1 and SR2 lead to the two multiplexer inputs of the fortieth multiplexer MUX40.

The multiplexers MUX1, MUX2, . . . , MUX40 alternately relay the signal words originating from the I and the Q signal components. Buffers are present in the multiplexers MUX1, MUX2, . . . , MUX40 for buffering the signal words that are not currently being output at the multiplexer output.

Signal words of word length $q_{sc}$ of the I and Q signal components are (alternately) available with a signal rate of $2/T_c$ at the forty outputs of the multiplexer unit MUXE1.

The forty outputs of the multiplexer unit MUXE1 are fed to a filter circuit FS1. The filter circuit FS1 includes forty multipliers M1, M2, . . . , M40 and four adders ADD1, ADD2, ADD3 and ADD4. Each multiplier M1, M2, . . . , M40 multiplies an output signal of the multiplexer unit MUXE1 by a single filter coefficient $g_1, g_2, \ldots, g_{40}$. The filter coefficients $g_1, g_2, \ldots, g_{40}$ are determined (in this specific exemplary embodiment) by a 4-fold oversampling of the pulse response, limited to a time interval of 10 $T_c$, of the fundamental spectral filter function (that is to say the transfer function of the filter circuit).

The spectral filter function can be an RRC (root raised cosine) function for example. Such a filter circuit is denoted as an RRC filter circuit. The RRC function is defined by the function $(1+\cos x)^{1/2}/2^{1/2}$ in the range of $0 \leq x \leq \pi$, which reproduces the functional relationship of the filter edge of the RRC in the spectral range.

The adders ADD1, ADD2, ADD3, ADD4 each have ten adder inputs. The ten adder inputs of the adder ADD1 are connected to the outputs of the multipliers M1, M5, M9, M13, M17, M21, M25, M29, M33 and M37, the inputs of the adder ADD2 are connected to the outputs of the multipliers M2, M6, M10, M14, M18, M22, M26, M30, M34, M38, etc. In other words, the four adders ADD1 to ADD4 are assigned to the four taps 1 to 4 of each memory location T1, T2, . . . , T10 of the shift registers SR1 and SR2.

A demultiplexer unit DMUXE1 is connected downstream of the filter circuit FS1. The demultiplexer unit DMUXE1 first demultiplexes each adder output with reference to the I and Q signal components, and subsequently multiplexes the result of the four adders ADD1, ADD2, ADD3, ADD4 separately in each case for the I signal component and the Q signal component. This produces a four-fold oversampled (filtered) I signal component at the output A1 of the device for spectral signal shaping ESF1, and a four-fold oversampled (filtered) Q signal component at the output A2.

A second embodiment of the inventive device for spectral signal shaping ESF2 is illustrated in FIG. 6. The device ESF2 likewise has two shift registers SR1 and SR2 that each have ten memory locations T1, T2, . . . , T10 and four taps per memory location. In contrast to ESF1, ESF2 includes only ten multiplexers MUX1', MUX2', . . . , MUX10' which are combined in a multiplexer unit MUXE2. Each multiplexer MUX1', MUX2', . . . , MUX10' has eight multiplexer inputs and a corresponding number of buffers. The eight multiplexer inputs of the multiplexer MUX1' are connected to the four taps of the two memory locations T1 with reference to the I signal component and the Q signal component, etc. In other words, each of the ten multiplexers MUX1', MUX2', . . . , MUX10' is assigned exactly one pair of memory locations T1, T1; T2, T2; . . . ; T10, T10 of the two shift registers SR1 and SR2.

The ten outputs of the multiplexer unit MUXE2 each have a signal rate of $8/T_c$.

The ten outputs of the multiplexer unit MUXE2 are fed to a filter circuit FS2. The filter circuit FS2 includes ten multipliers M1, . . . , M10 and an adder ADD, whose ten inputs are connected to the outputs of the multipliers M1, . . . , M10.

The multipliers M1, . . . , M10 operate using the 8-fold chip timing clock. The filter coefficients $g_1$ to $g_{40}$ illustrated in FIG. 6 are determined, in turn, by ten samples using four-fold oversampling of the spectral filter function (in particular RRC function). In contrast to the design of the filter circuit FS1 shown in FIG. 5, each multiplier M1, . . . , M10 shown here, processes a sequence of, for example, exactly four filter coefficients. That is to say, the multiplier M1 processes the filter coefficients $g_{1-4}$, the multiplier M2 processes the filter coefficients $g_{5-8}$, . . . , and the multiplier M10 processes the filter coefficients $g_{37-40}$. Since, as mentioned, the multipliers M1, . . . , M10 operate using the 8-fold chip timing clock, each multiplier M1, . . . , M10 sequentially processes four samples of the I signal component, and thereafter four samples of the Q signal component, using in each case the filter coefficients assigned to it.

Subsequently, the results of the ten multipliers M1, . . . , M10 are added in the adder ADD.

The results of the addition are communicated at a signal rate of $8/T_c$ to a demultiplexer DMUXE2 with a buffer. The demultiplexer DMUXE2 splits the results of the addition into the I signal component and the Q signal component, which are respectively output at a signal rate of $4/T_c$ at the outputs A1 and A2 of the device for spectral signal shaping ESF2.

The two embodiments ESF1 and ESF2 share the common feature that the multipliers of the filter coefficients are used, in a multiplex method, both for the I and for the Q signal components. The result is a reduction in the number of the multipliers implemented. Given a memory length of 10 $T_c$ that is comparable with the embodiments ESF1 and ESF2, the known filter structure shown in FIG. 3 would include 2×40 multipliers. In contrast, the design of ESF1 (see FIG. 5) only includes 1×40 multipliers, and the design of ESF2 (see FIG. 6) includes only 1×10 multipliers. The chip area required for the transmitter chip is reduced simultaneously with the reduction in the number of the multipliers.

A further advantageous common feature of the two embodiments consists in that the input signals of the device for spectral signal shaping ESF1/2 need not (no longer) be present in an oversampled state, whereas the output signals of the units ESF1/2 are made available with the (e.g. 4-fold) oversampling required for the further signal processing.

We claim:

1. A device for spectrally shaping a discrete-value transmission signal in a radio transmitter, comprising:
a first input for receiving an in-phase component of the transmission signal;
a second input for receiving a quadrature component of the transmission signal;
a first shift register having N first memory locations, said first shift register connected to said first input;
a second shift register having N second memory locations, said second shift register connected to said second input;
a multiplexer unit having a plurality of multiplexers;
a discrete-value filter circuit having a plurality of multipliers and at least one adder for spectrally shaping both the in-phase component and the quadrature component of the transmission signal, said multipliers being used, in a multiplex method, both for the in-phase component and for the quadrature component of the transmission signal;
a first output for providing a filtered in-phase component of the transmission signal;
a second output for providing a filtered quadrature component of the transmission signal;
a demultiplexer unit; and
a signal path;
each of said memory locations of said first shift register having M signal taps, and each of said memory locations of said second shift register having M signal taps, M being greater than one;
said multiplexer unit configured in the signal path downstream from said first shift register and said second shift register;
said multiplexer unit configured in the signal path upstream of said filter circuit; and
said demultiplexer unit configured in the signal path downstream of said filter circuit and upstream of said first output and said second output.

2. The device according to claim 1, wherein a plurality of filter coefficients are assigned to a single one of said plurality of said multipliers.

3. The device according to claim 2, wherein:
said plurality of said multiplexers of said multiplexer unit is N×M multiplexers; and
each one of said plurality of said multiplexers includes two multiplexer inputs.

4. The device according to claim 2, wherein:
said plurality of said multiplexers of said multiplexer unit is N multiplexers; and
each one of said plurality of said multiplexers includes 2×M multiplexer inputs.

5. The device according to claim 1, wherein:
said plurality of said multiplexers of said multiplexer unit is N multiplexers; and
each one of said plurality of said multiplexers includes 2×M multiplexer inputs.

6. The device according to claim 1, wherein:
said plurality of said multiplexers of said multiplexer unit is N×M multiplexers; and
each one of said plurality of said multiplexers includes two multiplexer inputs.

7. The device according to claim 1, wherein: said plurality of said multipliers have filter coefficients that have been selected such that said filter circuit performs Root-Raised-Cosine filtering.

8. The device according to claim 1, wherein:
the filtered in-phase component of the transmission signal has a sampling rate that is higher than that of the in-phase component of the transmission signal received at said first input by a multiple; and
the filtered quadrature component of the transmission signal has a sampling rate that is higher than that of the quadrature component of the transmission signal received at said second input by the multiple.

9. The device according to claim 8, wherein: the multiple is 4.

10. A method for spectrally shaping a discrete-value transmission signal in a radio transmitter, which comprises:
providing an in-phase component of the transmission signal at a first input that is connected to a first shift register having N first memory locations;
providing a quadrature component of the transmission signal at a second input that is connected to a second shift register having N second memory locations;
filtering the in-phase component of the transmission signal and the quadrature component of the transmission signal in a discrete-value filter circuit having a plurality of multipliers and at least one adder; for spectrally shaping both the in-phase component and the quadrature component of the transmission signal, using the multipliers in a multiplex method, both for the in-phase component and for the quadrature component of the transmission signal;
in a signal path upstream of the filtering, multiplexing the in-phase component of the transmission signal and the quadrature component of the transmission signal;
at each one of the N first memory locations, providing an output signal at a plurality of taps;
at each one of the N second memory locations, providing an output signal at a plurality of taps; and
demultiplexing the in-phase component of the transmission signal and the quadrature component of the transmission signal in a signal path downstream of the filtering.

11. The method according to claim 10, which comprises: assigning a plurality of filter coefficients to a single one of the plurality of the multipliers.

12. The method according to claim 11, which comprises: performing Root-Raised-Cosine filtering with the filter circuit.

13. The method according to claim 10, which comprises: performing Root-Raised-Cosine filtering with the filter circuit.

* * * * *